United States Patent
Hiramatsu et al.

(10) Patent No.: US 9,394,856 B2
(45) Date of Patent: Jul. 19, 2016

(54) OIL SEPARATOR FOR SEPARATING OIL FROM BLOW-BY GAS OF INTERNAL COMBUSTION ENGINE

(71) Applicant: TOYOTA BOSHOKU KABUSHIKI KAISHA, Aichi-ken (JP)

(72) Inventors: Chiaki Hiramatsu, Kariya (JP); Yoji Horiuchi, Kariya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 116 days.

(21) Appl. No.: 14/505,791

(22) Filed: Oct. 3, 2014

(65) Prior Publication Data

US 2015/0096272 A1    Apr. 9, 2015

(30) Foreign Application Priority Data

Oct. 9, 2013   (JP) ................. 2013-212154

(51) Int. Cl.
| | |
|---|---|
| *F02M 25/08* | (2006.01) |
| *B01D 45/04* | (2006.01) |
| *F01M 13/04* | (2006.01) |

(52) U.S. Cl.
CPC ........... *F02M 25/0872* (2013.01); *B01D 45/04* (2013.01); *F01M 13/04* (2013.01)

(58) Field of Classification Search
CPC . F01M 13/02; F01M 35/10; F01M 35/10222; F01M 35/10236; F16L 33/02; F16N 21/00
USPC .............. 55/385.1, 385.3; 123/198 E
See application file for complete search history.

(56) References Cited

U.S. PATENT DOCUMENTS

2015/0139632 A1 *   5/2015   Mueller ................. F01M 13/00
                                                          392/480

FOREIGN PATENT DOCUMENTS

| EP | 2899378 A1 * | 7/2015 | ............ F01M 13/02 |
| JP | 8-240114 | 9/1996 | |

* cited by examiner

*Primary Examiner* — Duane Smith
*Assistant Examiner* — Minh-Chau Pham
(74) *Attorney, Agent, or Firm* — Greenblum & Bernstein, P.L.C.

(57) ABSTRACT

An oil separator includes a separation chamber for separating oil mist from blow-by gas of an internal combustion engine and a case in which the separation chamber is formed. The oil separator further includes an introduction pipe, which is connected to the case and introduces blow-by gas into the separation chamber, and a discharge pipe, which is connected to the case and discharges blow-by gas that has passed through the separation chamber. An inlet inner wall portion, which is formed by a part of the discharge pipe that includes the inlet, protrudes further downward than an outlet inner wall portion, which is formed by a part of the discharge pipe that includes the outlet. A step is formed at the boundary between the inlet inner wall portion and the outlet inner wall portion to prevent oil from moving along the inner wall of the discharge pipe toward the outlet.

7 Claims, 4 Drawing Sheets

OIL SEPARATOR FOR SEPARATING OIL FROM BLOW-BY GAS OF INTERNAL COMBUSTION ENGINE

BACKGROUND OF THE INVENTION

The present invention relates to an oil separator for separating oil from blow-by gas of an internal combustion engine.

Internal combustion engines are equipped with a recirculation passage for recirculating blow-by gas to the intake passage. An oil separator is provided in such a recirculation passage to separate mist oil from blow-by gas (for example, Japanese Laid-Open Patent Publication No. 8-240114).

The oil separator has a box-like case the interior of which functions as a separation chamber for separating oil from blow-by gas. The case has a horizontally elongated shape. An introduction pipe is connected to the bottom wall of the case at a first end of the case in the longitudinal direction. A discharge pipe is connected to a side wall of the case at a second end of the case in the longitudinal direction. Also, an oil drain pipe is connected to the bottom wall of the case at the second end of the case in the longitudinal direction.

In such an oil separator, blow-by gas is introduced into the separation chamber through the introduction pipe. When blow-by gas passes through the separation chamber, the oil contained in the blow-by gas is separated from the blow-by gas. After passing through the separation chamber, the blow-by gas is discharged to the intake passage of the internal combustion engine via the discharge pipe. The oil that has been separated from blow-by gas in the separation chamber is returned to the oil pan via the oil drain pipe and is reused.

Although a large part of oil mist contained in the blow-by gas is separated from the blow-by gas when the blow-by gas passes through the separation chamber, not all the oil is separated from the blow-by gas. That is, some of the oil contained in blow-by gas flows into the discharge pipe together with the blow-by gas. The part of the oil mist that has flowed into the discharge pipe collects on the inner wall of the discharge pipe and is discharged to the intake passage of the internal combustion engine by the flow of the blow-by gas. This prevents the oil from being efficiently reused. A further improvement is therefore needed for preventing the amount of oil consumption from being increased and the use efficiency of oil from deteriorating.

SUMMARY OF THE INVENTION

Accordingly, it is an objective of the present invention to provide an oil separator that is capable of reducing the amount of oil that is discharged to the intake passage of an internal combustion engine via a discharge pipe.

To achieve the foregoing objective and in accordance with one aspect of the present invention, an oil separator is provided that includes a separation chamber for separating oil mist from blow-by gas of an internal combustion engine and a case in which the separation chamber is formed. The case includes an introduction pipe for introducing blow-by gas into the separation chamber and a discharge pipe for discharging blow-by gas that has passed through the separation chamber. The discharge pipe includes an outlet, an inner wall, and a step formed on the inner wall of the discharge pipe. The step restricts oil from moving toward the outlet along the inner wall of the discharge pipe.

According to the above described configuration, liquid oil collected on the inner wall of the discharge pipe is prevented from moving toward the outlet of the discharge pipe by the step formed on the inner wall. This prevents the oil collected on the inner wall of the discharge pipe from being discharged to the engine intake passage by flow of blow-by gas.

The present invention reduces the amount of oil that is discharged to the intake passage of an internal combustion engine via a discharge pipe.

DETAILED DESCRIPTION OF THE PREFERRED EMBODIMENTS

<First Embodiment>

An oil separator 100 according to a first embodiment will now be described with reference to FIGS. 1 to 5.

The oil separator 100 is provided in a recirculation passage (not shown) that recirculates blow-by gas of an internal combustion engine to the intake passage.

Figure 1:
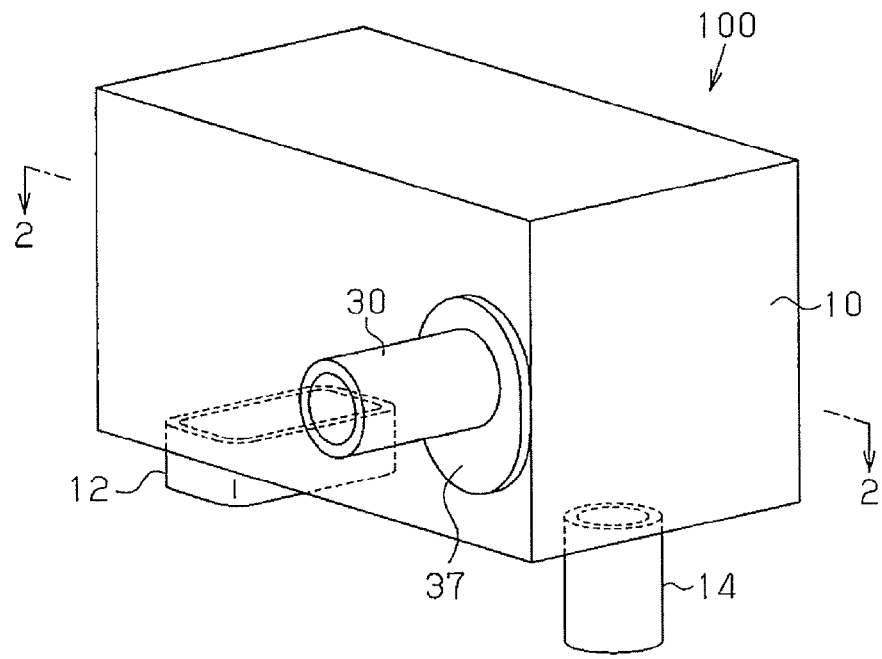
FIG. 1 is a perspective view illustrating an oil separator according to a first embodiment.

As shown in FIG. 1, the oil separator 100 has a box-like case 10. The case 10 has a horizontally elongated shape. An introduction pipe 12 is connected to the bottom wall of the case 10 at a first end of the case 10 in the longitudinal direction. A discharge pipe 30 is connected to a side wall of the case 10 in the vicinity of a second end of the case 10 in the longitudinal direction. Also, an oil drain pipe 14 is connected to the bottom wall of the case 10 in the vicinity of the second end of the case 10 in the longitudinal direction.

Figure 2:
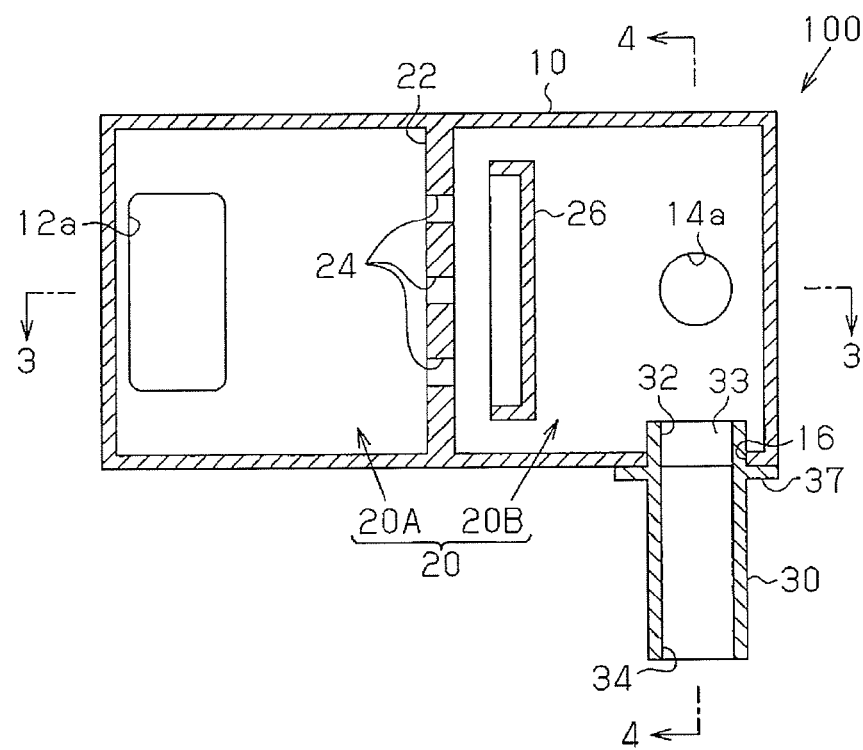
FIG. 2 is a cross-sectional view taken along line 2-2 of FIG. 1.
Figure 3:
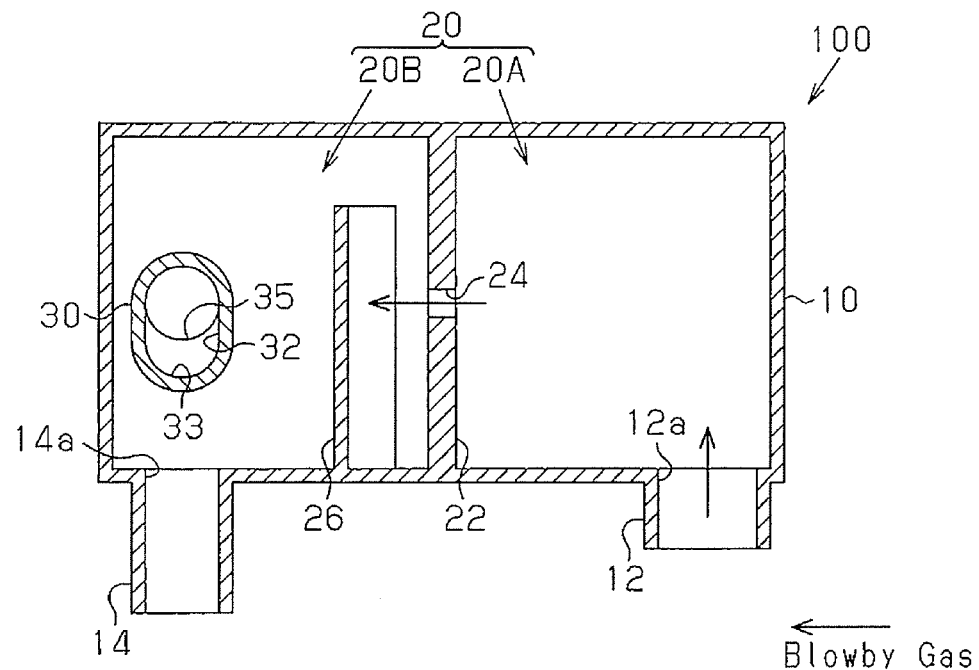
FIG. 3 is a cross-sectional view taken along line 3-3 of FIG. 2.

As shown in FIGS. 2 and 3, the interior of the case 10 functions as a separation chamber 20 for separating oil mist contained in the blow-by gas that is introduced through the introduction pipe 12.

The separation chamber 20 has a partition wall 22. The partition wall 22 divides the interior of the case 10 into an upstream space 20A, which includes an opening 12a of the introduction pipe 12, and a downstream space 20B, which includes an inlet of the discharge pipe 30 and an opening 14a of the oil drain pipe 14.

Figure 4:
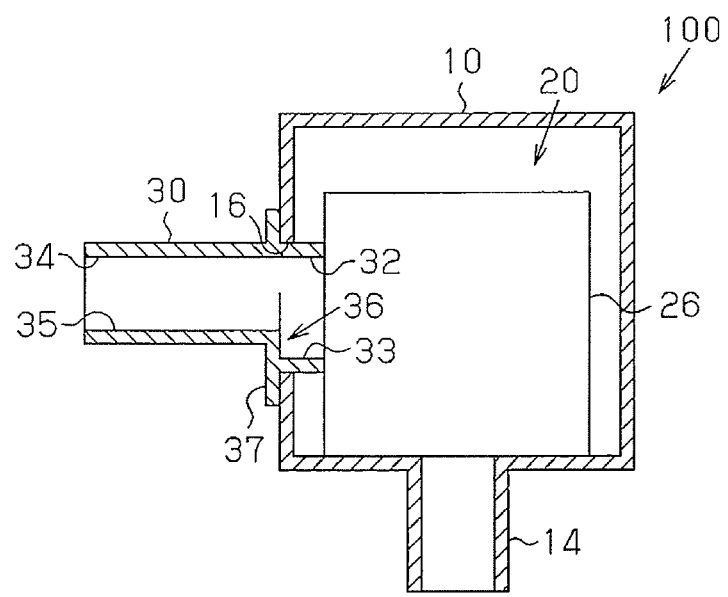
FIG. 4 is a cross-sectional view taken along line 4-4 of FIG. 2.

The partition wall 22 has communication holes 24 that connect the upstream space 20A and the downstream space 20B with each other. An impingement plate 26 is provided to extend vertically on the bottom wall of the case 10, which defines the downstream space 20B. As shown in FIGS. 2 and 4, a clearance exists between each side of the impingement plate 26 and the corresponding side wall of the case 10. As shown in FIGS. 3 and 4, a clearance exists between the upper end of the impingement plate 26 and the upper wall of the case 10.

As shown in FIGS. 1, 2, and 4, the discharge pipe 30 is oriented horizontally and has a flange 37 formed over the entire outer circumferential surface. As shown in FIGS. 2 and 4, the flange 37 is located away from the ends of the discharge pipe 30. The part of the discharge pipe 30 that includes an inlet 32 is inserted into an insertion hole 16 formed in the side wall of the case 10 from the outside, so that the inlet 32 protrudes into the case 10. The flange 37 is welded or bonded to the side wall of the case 10.

As shown FIGS. 1 and 3, a part of the discharge pipe 30 from an outlet 34 to the flange 37 is cylindrical. A part of the discharge pipe 30 from the inlet 32 to the flange 37 protrudes further downward than the part of the discharge pipe 30 from the outlet 34 to the flange 37. That is, a part of the inner wall of the discharge pipe 30 that includes the outlet 34 forms an outlet inner wall portion 35, which has a circular cross-section. In contrast, a part of the inner wall of the discharge pipe 30 that includes the inlet 32 forms an inlet inner wall portion 33, which has an oval cross-section. Therefore, the lower part of the inlet inner wall portion 33 protrudes downward in relation to the outlet inner wall portion 35.

As shown in FIG. 4, a step 36 is formed at the boundary between the inlet inner wall portion 33 and the outlet inner wall portion 35. The step 36 prevents oil from moving along the inner wall of the discharge pipe 30 toward the outlet 34.

Operation of the first embodiment will now be described.

In the oil separator 100, the intake negative pressure of the internal combustion engine introduces blow-by gas into the upstream space 20A of the separation chamber 20 via the introduction pipe 12. The blow-by gas flows into the downstream space 20B via the communication holes 24. When the blow-by gas passes through the communication holes 24, the flow velocity of the blow-by gas is increased, so that the blow-by gas strikes the impingement plate 26 at a high velocity. The oil mist contained in the blow-by gas collects on the impingement plate 26 and is thus separated from the blow-by gas. After the strike, the blow-by gas flows to a section downstream of the impingement plate 26 through the clearance between the impingement plate 26 and the inner wall of the case 10, and is discharged downstream through the discharge pipe 30, that is, to the intake passage of the internal combustion engine. The oil that has been separated from the blow-by gas in the separation chamber 20 is returned to the oil pan (not shown) via the oil drain pipe 14 to be reused.

Figure 5:
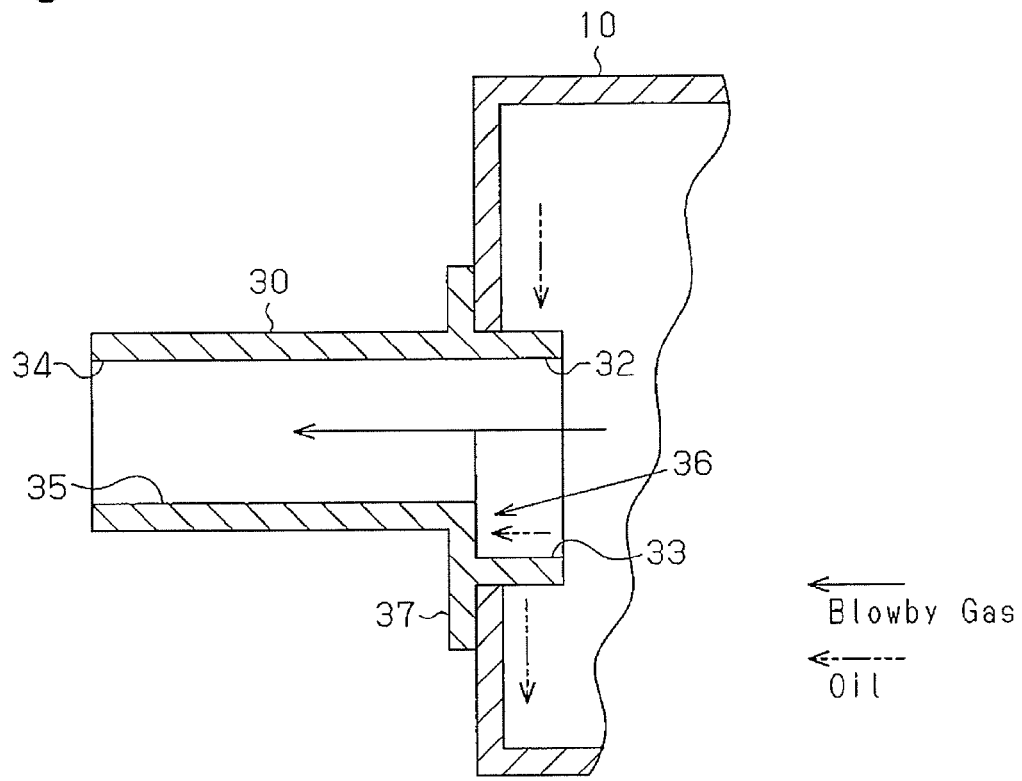
FIG. 5 is an enlarged cross-sectional view of a part of FIG. 4, showing operation of the first embodiment.

The oil separated from blow-by gas collects on the inner wall of the case 10. As shown in FIG. 5, in the first embodiment, since the inlet 32 of the discharge pipe 30 protrudes into the case 10, the oil collected on the inner wall of the case 10 is prevented from moving into the discharge pipe 30 along the inner wall.

Although most of the oil mist contained in the blow-by gas is separated from the blow-by gas when the blow-by gas passes through the separation chamber 20, some of the oil is not separated from the blow-by gas in some cases. Such unseparated oil can flow into the discharge pipe 30 together with blow-by gas.

As shown in FIG. 5, in the discharge pipe 30 of the first embodiment, the flow path cross-sectional area of the inlet inner wall portion 33 is larger than the flow path cross-sectional area of the outlet inner wall portion 35. Thus, compared to a case in which the flow path cross-sectional area of the inner wall 33 of the discharge pipe 30 is the same as the flow path cross-sectional area of the outlet inner wall portion 35 over the entire discharge pipe 30, the flow velocity of the blow-by gas that flows at the inlet inner wall portion 33 is small in the discharge pipe 30 of the first embodiment. Therefore, a slight amount of oil mist contained in the blow-by gas easily contacts and collects on the inlet inner wall portion 33 or the step 36, which is formed at the boundary between inlet inner wall portion 33 and the outlet inner wall portion 35.

Some of the oil that has flowed to a part of the discharge pipe 30 that corresponds to the inlet inner wall portion 33 together with blow-by gas collects on the inner wall of the discharge pipe 30. Since the discharge pipe 30 of the first embodiment is oriented horizontally, the oil collected on the inner wall of the discharge pipe 30 moves downward along the inner wall due to the gravity and is gathered at the lower part of the inlet inner wall portion 33. However, the movement of the oil toward the outlet 34 caused by the flow of blow-by gas is restricted by the step 36. This prevents the oil gathered at the lower part of the inlet inner wall portion 33 of the discharge pipe 30 from being discharged to the engine intake passage by the flow of blow-by gas.

The oil separator 100 according to the first embodiment achieves the following advantages.

(1) The inlet inner wall portion 33, which is formed by a part of the discharge pipe 30 that includes the inlet 32, protrudes further downward than the outlet inner wall portion 35, which is formed by a part of the discharge pipe 30 that includes the outlet 34. The step 36 is formed at the boundary between the inlet inner wall portion 33 and the outlet inner wall portion 35 to prevent oil from moving along the inner wall of the discharge pipe 30 toward the outlet 34.

According to this structure, compared to a case in which the flow path cross-sectional area of the discharge pipe 30 is the same as the flow path cross-sectional area of the outlet inner wall portion 35 over the entire discharge pipe 30, the flow velocity of the blow-by gas that flows at the inlet inner wall portion 33 in the discharge pipe 30 is small. Therefore, a slight amount of oil mist contained in the blow-by gas easily contacts and collects on the inlet inner wall portion 33 or the step 36, which is formed at the boundary between inlet inner wall portion 33 and the outlet inner wall portion 35.

The oil collected on the inlet inner wall portion 33 of the discharge pipe 30 is prevented from moving toward the outlet 34 by the step 36 formed at the lower part of the inner wall. This prevents the oil collected on the inlet inner wall portion 33 of the discharge pipe 30 from being discharged to the engine intake passage by the flow of blow-by gas. The amount of oil that is discharged to the engine intake passage via the discharge pipe 30 is thus reduced.

(2) The discharge pipe 30 is formed separately from the case 10. The discharge pipe 30 with the step 36 is therefore easy to mold.

(3) The inlet 32 of the discharge pipe 30 protrudes into the case 10. This prevents the oil collected on the inner wall of the case 10 from entering the discharge pipe 30 along the inner wall. Therefore, oil is prevented from flowing into the discharge pipe 30.

(4) The step 36 is formed at a lower part of the inner wall of the discharge pipe 30. The step 36 therefore effectively presents the oil gathered at the lower part of the inlet inner wall portion 33 of the discharge pipe 30 from moving toward the outlet 34.

<Second Embodiment>

An oil separator 100 according to a second embodiment will now be described with reference to FIGS. 6(a) and 6(b).

The second embodiment is different from the first embodiment in that a lower upstream end of an outlet inner wall portion 135 of a discharge pipe 130 extends to a further upstream position than a flange 137.

Figure 6A:
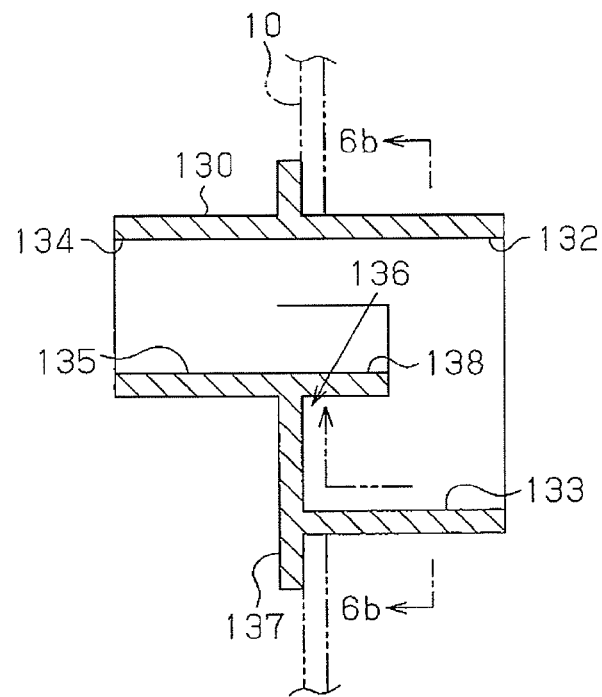
FIG. 6(a) is a cross-sectional view showing a discharge pipe, which is a part of an oil separator according to a second embodiment.
Figure 6B:
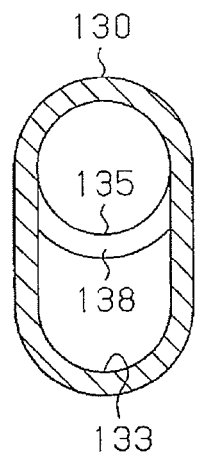
FIG. 6(b) is a cross-sectional view taken along line 6b-6b of FIG. 6(a)

FIGS. 6(a) and 6(b), the lower upstream end of the outlet inner wall portion 135 has an extension 138, so that the lower upstream end of the outlet inner wall portion 135 extends to a further upstream position than the flange 137. Therefore, the lower downstream end of the outlet inner wall portion 135 is located downstream of an inlet 132.

The oil separator 100 according to the second embodiment achieves the following advantage.

(4) The extension 138, which extends upstream, is formed at the lower upstream end of the outlet inner wall portion 135 of the discharge pipe 130. Therefore, the oil gathered at the lower part of an inlet inner wall portion 133 is prevented from moving toward an outlet 134 over a step 136.

<Third Embodiment>

An oil separator 100 according to a third embodiment will now be described with reference to FIGS. 7(a) and 7(b).

The third embodiment is different from the first embodiment in that a groove 239 is formed at the lower part of the inner wall of a discharge pipe 230, and the groove 239 and the inner wall of the discharge pipe 230 form a step 236.

Figure 7A:
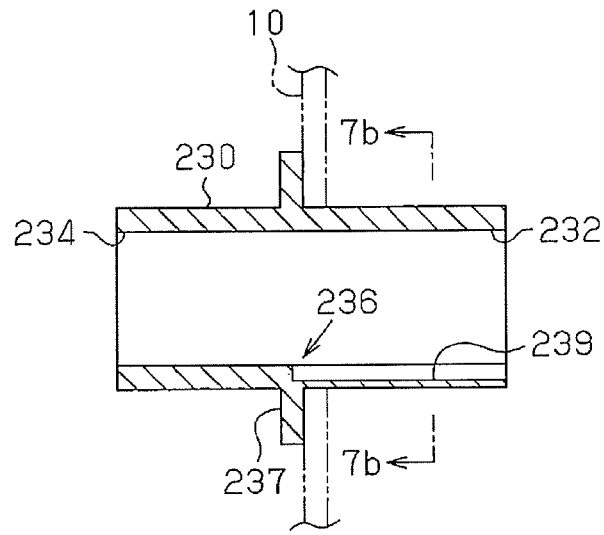
FIG. 7(a) is a cross-sectional view showing a discharge pipe that is a part of an oil separator according to a third embodiment.
Figure 7B:
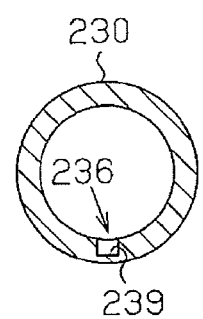
FIG. 7(b) is a cross-sectional view taken along line 7b-7b of FIG. 7(a)

As shown in FIGS. 7(a) and 7(b), the groove 239 is formed at the lower part of the inner wall of the discharge pipe 230, and the groove 239 extends along the discharge pipe 230 from a position in the discharge pipe 230 to an inlet 232. Thus, the downstream end of the groove 239 and the inner wall of the discharge pipe 230 that is located downstream of and adjacent to the groove 239 form a step 236. The groove 239 has a constant depth along the length of the discharge pipe 230.

The oil separator 100 according to the third embodiment achieves the following advantage.

(5) The groove 239 is formed at the lower part of the inner wall of the discharge pipe 230, and the groove 239 extends along the discharge pipe 230 from a position in the discharge pipe 230 to the inlet 232. The downstream end of the groove 239 and the inner wall of the discharge pipe 230, which extends to a further downstream position than the groove 239, form the step 236.

This structure facilitates the formation of the step 236 on the inner wall of the discharge pipe 230 while allowing the discharge pipe 230 to have a constant outer diameter along the length of the discharge pipe 230.

<Fourth Embodiment>

An oil separator 100 according to a fourth embodiment will now be described with reference to FIGS. 8(a) and 8(b).

Figure 8A:
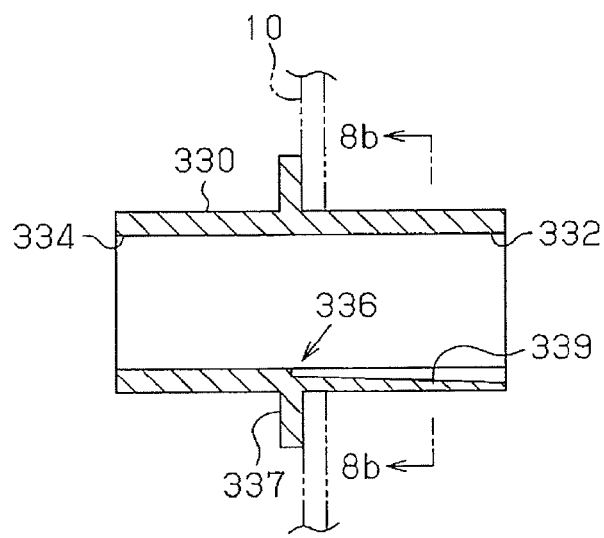
FIG. 8(a) is a cross-sectional view showing a discharge pipe that is a part of an oil separator according to a fourth embodiment.
Figure 8B:
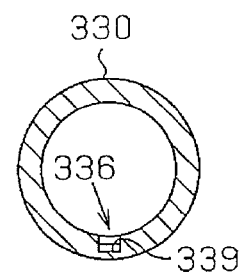
FIG. 8(b) is a cross-sectional view taken along line 8b-8b of FIG. 8(a)

As shown in FIGS. 8(a) and 8(b), the fourth embodiment is different from the third embodiment in that the bottom surface of a groove 339 formed at the lower part of a inner wall of a discharge pipe 330 is inclined downward toward an inlet 332 of the discharge pipe 330.

The oil separator 100 according to the fourth embodiment achieves the following advantage.

(6) The groove 339 is formed at the lower part of the inner wall of the discharge pipe 330, and the groove 339 extends along the discharge pipe 330 from a position in the discharge pipe 330 toward the inlet 332. The downstream end of the groove 339 and the inner wall of the discharge pipe 330, which is adjacent to and downstream of the groove 339, form the step 336. The bottom surface of the groove 339 is inclined downward toward the inlet 332 of discharge pipe 330.

This structure causes oil to flow along the inner wall of the discharge pipe 330 and gather in the groove 339 to flow toward the inlet 332. Therefore, the oil collected on the inner wall of the discharge pipe 330 can be easily returned to the interior of the case 10.

The oil separator 100 according to the present invention is not to be restricted to the configurations shown in the above embodiments, but may be modified as shown below, for example.

The inlet inner wall portions 33, 133 of the discharge pipes 30, 130 described in the first and second embodiments may be inclined downward toward the inlets 32, 132 of the discharge pipes 30, 130. In these cases, oil gathered at the lower parts of the inlet inner wall portions 33, 133 moves toward the inlets 32, 132. Therefore, the oil collected on the inner walls of the discharge pipes 30, 130 can be easily returned to the interior of the case 10.

The grooves 239, 339 described in the third and fourth embodiments may be formed at the lower parts of the inlet inner wall portions 33, 133 of the discharge pipes 30, 130 described in the first and second embodiments.

Figure 9:
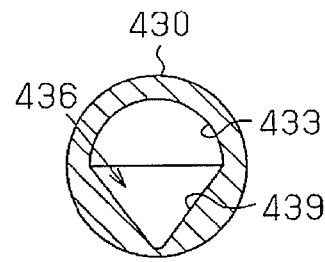
FIG. 9 is a cross-sectional view showing a discharge pipe that is a part of an oil separator according to a modification of the third and fourth embodiments.

The grooves 239, 339, which are formed in the inlet inner wall portions 33, 133 of the discharge pipes 230, 330 described in the third and fourth embodiments may have shapes other than those illustrated above. FIG. 9 shows a modification of these embodiments. In this modification, a groove 439 having a V-shaped cross-section is formed in an inlet inner wall portion 433 of a discharge pipe 430, and the groove 439 is located below a horizontal plane that contains the center of the cross section of an inlet inner wall 433 of a discharge pipe 430. In this case, oil collected on the inlet inner wall portion 433 moves downward along the inclined surface of the groove 439 is therefore easily gathered in the groove 439. Further, if the outlet inner wall portions 35, 135 are formed to have a semicircular cross-section as shown in FIG. 9, a step 436 having a relatively large area is formed. This structure effectively prevents oil from moving toward the outlets 234, 334 of the discharge pipe 430.

In the above described embodiments and modification, the inlets 32, 132, 232, and 332 of the discharge pipes 30, 130, 230, 330, and 430 protrude into the case 10. However, the inlets 32, 132, 232, and 332 of the discharge pipes 30, 130, 230, 330, and 430 do not necessarily need to protrude into the case 10. That is, the upstream ends of the discharge pipes 30, 130, 230, 330, and 430 may be connected to a side wall of the case 10.

In the above described embodiments and modification, the discharge pipes 30, 130, 230, 330, and 430 are connected to the side wall of the case 10 and are oriented horizontally. However, the discharge pipes 30, 130, 230, 330, and 430 may be connected to the upper wall of the case 10 and oriented upward. In this case, the steps 36, 136, 236, 336, and 436 are preferably formed along the entire inner circumferential walls of the discharge pipes 30, 130, 230, 330, and 430. Further, the discharge pipes 30, 130, 230, 330, and 430 may be oriented obliquely with respect to the vertical direction.

The invention claimed is:

1. An oil separator, comprising:
a separation chamber for separating oil mist from blow-by gas of an internal combustion engine; and
a case in which the separation chamber is formed, wherein the case includes an introduction pipe for introducing blow-by gas into the separation chamber and a discharge pipe for discharging blow-by gas that has passed through the separation chamber,
wherein the discharge pipe includes
an outlet,
an inner wall, and
a step formed on the inner wall of the discharge pipe, wherein the step restricts oil from moving toward the outlet along the inner wall of the discharge pipe.

2. The oil separator according to claim 1, wherein
the discharge pipe includes an inlet, and
the inlet protrudes into the case.

3. The oil separator according to claim 1, wherein
a part of the inner wall of the discharge pipe that includes the inlet forms an inlet inner wall portion,
a part of the inner wall of the discharge pipe that includes the outlet forms an outlet inner wall portion,
the inlet inner wall portion protrudes further outward than the outlet inner wall portion, and
the step is formed at a boundary between the inlet inner wall portion and the outlet inner wall portion.

4. The oil separator according to claim 1, wherein
a groove is formed in the inner wall of the discharge pipe,
the groove extends from a position in the discharge pipe to the inlet, and
the step is formed by a downstream end of the groove and the inner wall of the discharge pipe.

5. The oil separator according to claim 1, wherein the step is formed at a lower part of the inner wall of the discharge pipe.

6. The oil separator according to claim 5, further comprising:
an inlet inner wall portion that is formed by a part of the inner wall of the discharge pipe that includes the inlet; and
an outlet inner wall portion that is formed by a part of the inner wall of the discharge pipe that includes the outlet, wherein
the inlet inner wall portion protrudes further outward than the outlet inner wall portion,
the step is formed at a boundary between the inlet inner wall portion and the outlet inner wall portion, and
the inlet inner wall portion is inclined downward toward the inlet of discharge pipe.

7. The oil separator according to claim 5, wherein
a groove is formed in the inner wall of the discharge pipe,
the groove extends from a position in the discharge pipe to the inlet,
the step is formed by a downstream end of the groove and the inner wall of the discharge pipe, and
a bottom surface of the groove is inclined downward toward the inlet of discharge pipe.

* * * * *